United States Patent
Ng et al.

(10) Patent No.: US 7,631,666 B1
(45) Date of Patent: Dec. 15, 2009

(54) REINFORCED FLEXIBLE HOSE WITH LEAKAGE INDICATOR AND METHOD OF MAKING SAME

(76) Inventors: Kwan Yuen Abraham Ng, 12202 Garvey Ave., El Monte, CA (US) 91732; Sarah Seen Yui Chan Ng, 12202 Garvey Ave., El Monte, CA (US) 91732

( * ) Notice: Subject to any disclaimer, the term of this patent is extended or adjusted under 35 U.S.C. 154(b) by 0 days.

(21) Appl. No.: 12/185,608

(22) Filed: Aug. 4, 2008

(51) Int. Cl.
*F16L 55/00* (2006.01)

(52) U.S. Cl. ............... 138/104; 138/36; 138/127; 138/138; 116/206; 73/40; 73/40.5 R

(58) Field of Classification Search ......... 138/104, 138/36, 127, 138; 73/40, 40.5 R, 73–77, 73/762; 116/206
See application file for complete search history.

(56) References Cited

U.S. PATENT DOCUMENTS

| | | | |
|---|---|---|---|
| 3,011,525 A | 12/1961 | Randle et al. ............ 138/126 |
| 3,079,664 A | 3/1963 | Grant .................... 427/445 |
| 3,599,677 A | 8/1971 | O'Brien ................. 138/122 |
| 3,750,712 A | 8/1973 | Brand .................... 432/116 |
| 3,911,959 A * | 10/1975 | Frank ..................... 138/36 |
| 4,103,713 A | 8/1978 | Haytock, III ............ 138/133 |
| 4,200,125 A | 4/1980 | Hush et al. |
| 4,366,746 A | 1/1983 | Rosecrans ............ 138/125 X |
| 4,472,463 A | 9/1984 | Solomon ................ 427/381 |
| 4,735,083 A * | 4/1988 | Tenenbaum ............ 73/40.5 R |
| 4,817,613 A | 4/1989 | Jaraczewski et al. .... 138/125 X |
| 4,842,024 A | 6/1989 | Palinchak ............... 138/125 |
| 4,851,469 A | 7/1989 | Saitoh .................... 524/566 |
| 5,129,428 A * | 7/1992 | Winter et al. ............ 138/104 |
| 5,142,782 A | 9/1992 | Martucci ............... 29/890.144 |
| 5,228,478 A * | 7/1993 | Kleisle .................. 138/104 |
| 5,343,738 A | 9/1994 | Skaggs .................. 73/40.5 |
| 5,622,210 A * | 4/1997 | Crisman et al. ......... 138/104 |
| 5,647,401 A * | 7/1997 | Nobori ................... 138/126 |
| 5,690,146 A * | 11/1997 | Stammen ................ 138/36 |
| 6,550,499 B1 * | 4/2003 | Pai ....................... 138/104 |
| 6,877,359 B2 * | 4/2005 | Huang et al. ............ 73/40 |
| 2005/0087250 A1 * | 4/2005 | Ng et al. ................ 138/127 |
| 2005/0092070 A1 * | 5/2005 | Bhatti .................... 73/40 |

OTHER PUBLICATIONS

WO 94/02772 Doan T. Leak Detection for Liquid Hoses Feb. 3, 1994.*

* cited by examiner

*Primary Examiner*—Patrick F Brinson
(74) *Attorney, Agent, or Firm*—David A. Belasco; Belasco Jacobs & Townsley, LLP

(57) ABSTRACT

A reinforced flexible hose that has at least one layer of stainless steel threads braided about the outer surface of the inner core and a transparent flexible polymeric covering located over the braided stainless steel threads, thereby protecting them from abrasion and corrosion. The covering is not in intimate contact with the circumference of each thread thereby trapping pockets of air between the covering and the threads. A moisture sensitive compound is dispersed through the stainless steel threads under the transparent covering. When the compound becomes wet, it changes from a first color to a second color indicating that the hose has failed.

10 Claims, 5 Drawing Sheets

REINFORCED FLEXIBLE HOSE WITH LEAKAGE INDICATOR AND METHOD OF MAKING SAME

FIELD OF INVENTION

The invention pertains to reinforced hoses. More particularly, the invention relates to plastic core hoses with braided reinforcing, protective outer coverings and an integral leakage indicator for use in plumbing applications and related uses.

BACKGROUND OF THE INVENTION

A number of applications are best served by flexible hoses. Most notably, hoses connecting fixed plumbing outlets to vibrating machinery or appliances require the use of flexible hoses to prevent cracking and resultant leaks. Resilient materials, including various types of rubber and plastic, have been employed in situations requiring flexible hoses, however, a number of problems are typically encountered. The flexible materials employed in such hoses tend not to be as strong and resistant to higher pressures as solid, non-flexible materials. Further, such materials tend to stretch and further weaken under pressure, putting strain upon the points of attachment of these hoses to fittings and couplings. A number of methods have been developed to give flexible hoses the strength and durability needed while maintaining the required flexibility.

A further problem associated with hoses connecting vibrating or moving equipment, such as washing machines and dishwashers is that the hoses may develop cracks, defects and other problems that result in potentially damaging leakage. Often these leaks are small at first and are difficult to detect. If such leaks go undetected, they may become catastrophic, causing major damage to walls, floors, etc. The present invention addresses this problem by providing a visual indicator of any leak in the hose. A simple inspection of the color of the hose, visible through the transparent covering, will allow a defective hose to be timely replaced.

U.S. Pat. No. 4,699,178 issued to Washkewicz discloses a high burst strength flexible composite hose having low volumetric expansion under pressure which includes a thermoplastic core tube, one or more braided reinforcing layers of high strength aramid yarn having a tensile modulus of elasticity of about 17,000,000 psi and a tenacity of more than 20 grams per denier at room temperature, and an outer cover of elastomeric material.

U.S. Pat. No. 4,111,237 issued to Muntzner et al. describes a hydraulic brake hose comprising a polychloroprene inner tube, a reinforcing braid of twisted glass fiber yarn around the tube, a styrene-butadiene copolymer rubber cushion layer over the glass braid, a second reinforcing braid of nylon fiber yarn over the cushion layer and a cover layer of polychloroprene rubber.

U.S. Pat. No. 5,803,129 issued to Coronado et al. discloses an improved reinforced hose for conducting fluids and gases, and a method of manufacturing that hose. The improved reinforced hose includes an interior tube having an inner bore and an outer surface. The improved reinforced hose also includes an outer covering disposed directly about the outer surface of the interior tube. Such outer covering includes one or more layers of plastic threads, which are formed by disposing a plastic substance about core material.

U.S. Pat. No. 5,381,834 issued to King describes a hose assembly of the type for carrying high-pressure fluids therethrough. The hose assembly includes a tubular member and a pair of coupling members. The tubular member includes an inner liner of a fluorocarbon polymer. Yarns fabricated from fibers, including glass fibers and Aramid fibers, are braided together about the exterior of the inner liner to form a braided layer. The assembly further includes an outer fluorocarbon coating dispersed throughout the braided layer to prevent kinking or permanent deformation in the inner liner, in addition to preventing the crushing of the yarns when the ends are crimped to receive the coupling members. A conductive strip is formed on the inner liner for dissipating electrical charges that may accumulate in the inner liner.

U.S. Pat. No. 5,142,782 issued to Martucci describes a method of making a lightweight hose assembly including a step of extruding the inner liner. A nonmetallic material is then braided about the exterior of the liner. The inner liner and braided layer are then passed through a reservoir containing a solution of the fluorocarbon polymer. The solvent is then removed, leaving a fluorocarbon polymer coating dispersed throughout the braided layer.

U.S. Pat. No. 4,915,762 issued to Berlincourt et al. discloses a hose comprising an inner plastic tube covered by at least one braiding of filaments disposed in helically crossed layers around the inner tube, characterized in that the filaments are made of plastics and are so deformed in their right cross-section that the gap between any two adjacent layers which extend in the same direction as one another is at least 100% filled. The invention also relates to a process for the production of the hose.

U.S. Pat. No. 4,952,262 issued to Washkewicz, et al. discloses a method of hose construction and product formed thereby consisting of an extruded thermoplastic core tube having ferrometallic wire reinforcement windings thereon which are closely wound and providing minute spaces between the wires. The reinforced core tube structure is elevated in temperature by an induction heater which concentrates heating in the wire reinforcement and transfers heat from the wire by conduction to the outer periphery of the core tube. Supplemental conventional heaters may be used in conjunction therewith to achieve substantial temperature elevation of the wire reinforcement. Thereafter a thermoplastic cover is pressure extruded over the heated wire reinforcement and forced through the minute spaces in the reinforcement into engagement with the core tube periphery. Cool-down establishes a bond between cover, wires and core tube and a mechanically locked, integral composite hose structure.

U.S. Pat. No. 4,275,768 to Riggs, et al. discloses a longitudinally extending, circumferentially limited member is disposed upon the exterior surface of a tubular object such as hose, which member has a surface appearance contrasting to that of the exterior surface of the tubular object. Indicia are engraved within the surface of the longitudinally extending, circumferentially limited member and is rendered prominently visible by the difference in contrast between the two surface appearances.

U.S. Pat. No. 4,585,035 to Piccoli discloses a flexible hose having a braided spiral reinforcement layer having one wire braid member which remains uncrimped during braiding and a second braid member which is composed of a relatively flexible, high tenacity material which is crimped or deformed around the wire braid member at each contact point in the braided-spiral layer. The hose may be made using a flexible mandrel technique to produce a light weight hose having improved flexibility for use in high pressure applications such as in hydraulic system components.

The problems with the prior art described above include:

1. It is difficult to obtain good adhesion between the braid and the outer covering because the braid is hard to clean.

2. The outer plastic layer is uneven because it is applied over an uneven braid.

3. The outer plastic layer is typically very thin, of the order of 0.3 to 0.5 mm.

4. The outer plastic layer tends to break when the tubes are bent.

5. Stresses on the hose due to vibrating machinery may result in leaks that, if undetected, may result in major damage to surroundings.

It is an objective of the present invention to provide a flexible hose capable of withstanding vibration and jarring. It is a further objective to provide a hose capable of handling relatively high pressure without expanding in diameter. It is a still further objective of the invention to provide a hose that will not rust, corrode or oxidize. It is yet a further objective to provide a hose that will indicate a leaking condition before such leaks become catastrophic. It is a final objective to provide a hose that may be easily and inexpensively manufactured in any desired length.

While some of the objectives of the present invention are disclosed in the prior art, none of the inventions found include all of the objectives identified above.

SUMMARY OF THE INVENTION (1) A reinforced flexible hose is provided. The hose has an interior tube for conducting a fluid. The tube has an inner bore and an outer surface, at least one layer of stainless steel threads braided about the outer surface and a transparent, flexible polymeric covering. The covering is located over the stainless steel threads and contacts them tangentially, thereby protecting them from abrasion and corrosion. Pockets of air are trapped under the transparent polymeric covering and between the strands of stainless steel. A moisture sensitive compound is provided. The compound changes from an initial color to a second color upon contact with moisture. The compound is dispersed in the pockets of air trapped between the threads and the transparent flexible polymeric covering. The flexible polymeric covering protects the steel braids from corrosion and abrasion. The pockets of air assist in insulating the interior tube and stainless steel braid. When moisture penetrates from the interior tube to the stainless steel threads, the moisture sensitive compound will changes to the second color, indicating failure of the hose.

(2, 14) In a variant, the interior tube is formed of synthetic polymer material.

(3, 15) In another variant, the interior tube is formed of material selected from the following group: ethylene-propylene-compound diene, acrylonitrile-butadiene, synthetic resinous fluorine, nylon, thermoplastic polyester elastomer, polyurethane, polyvinyl chloride and rubber.

(4, 16) In yet another variant, the stainless steel threads are grouped into distinct strands that are interwoven to form at least one braided layer of threads.

(5, 17) In a further variant, the strands contain between about two and about nine stainless steel threads.

(6, 18) In still a further variant, the gauge of the stainless steel threads ranges from about 0.002 inches to about 0.070 inches.

(7, 19) In another variant, the stainless steel threads are located about the interior tube under tension and the tension ranges from about 0.5 pounds to about 3 pounds.

(8, 20) In yet another variant, the moisture sensitive compound is selected from the group including copper sulfate, cobalt chloride, and cobalt iodide.

(9, 21) In a further variant, the flexible polymeric covering is formed of material selected from the following group: ethylene-propylene-compound diene, acrylonitrile-butadiene, synthetic resinous fluorine, nylon, thermoplastic polyester elastomer, polyvinyl chloride, polyurethane and rubber.

(10, 22) In yet another variant, the flexible polymeric covering is about 0.8 to 1.0 mm thick.

(11) The hose is manufactured as follows.

(12) A. The interior tube is fabricated, preferably by extrusion.

B. At least one layer of stainless steel threads is braided about the outer surface of the interior tube.

(13) C. The flexible polymeric covering is fabricated, preferably by extrusion.

D. The moisture sensitive compound is dispersed between the stainless steel threads.

E. The flexible polymeric covering is slipped over the braid. This traps pockets of air between the covering and the braid thereby protecting the braid from abrasion and corrosion and improving the insulative properties of the hose. The moisture sensitive compound alerts the user to any leaks in the hose through a visual inspection.

The hose construction represented in this invention is an improvement over the prior art. Hoses in accordance with this invention have a smooth outer surface which is easier to clean. Since the outer covering is actually an independent member it is less likely to peel of and sustain damage during bending. Hoses constructed in accordance with this invention are thus stronger, more flexible and will inform the user of any leaks developing in the hose.

Figure 1:
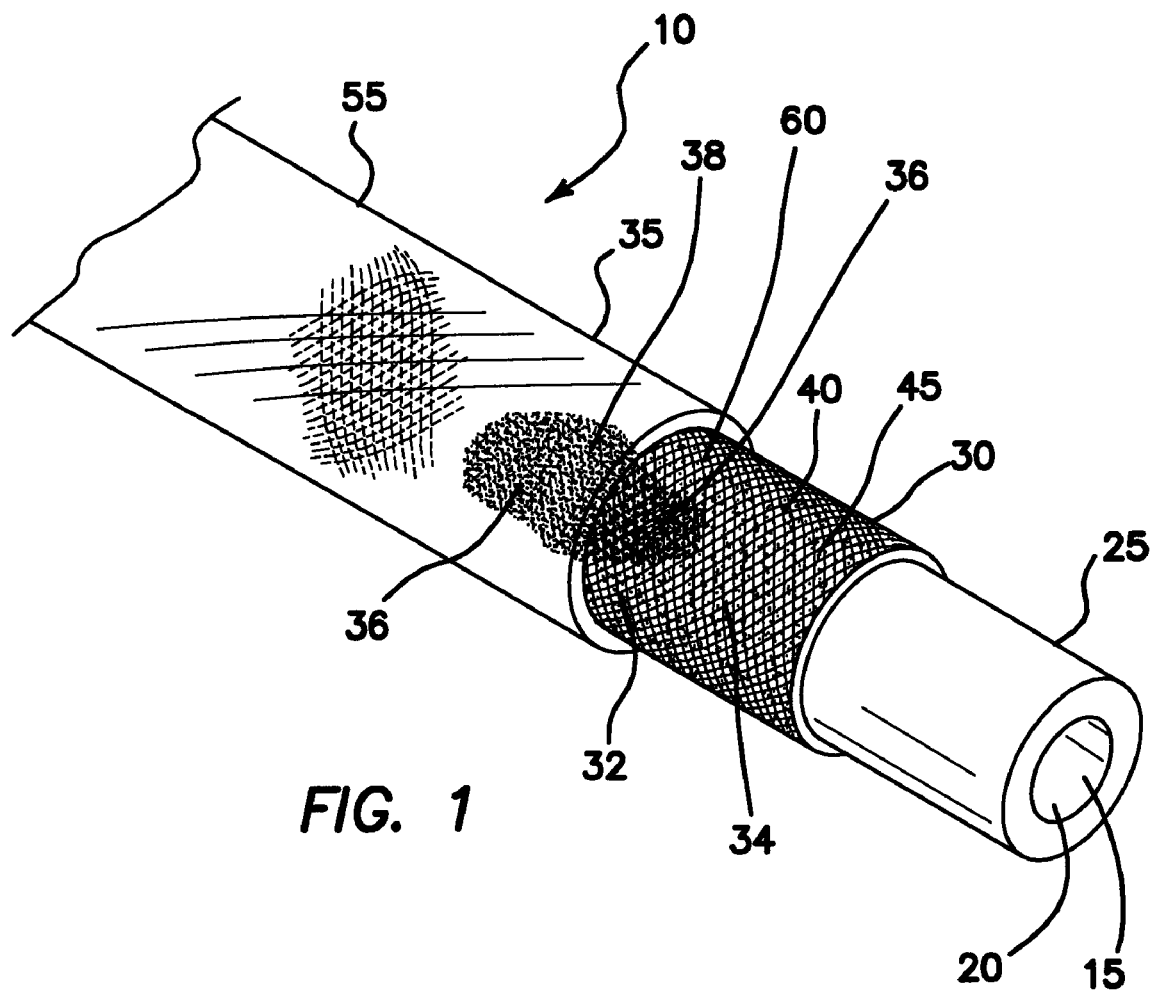
FIG. 1 is a perspective view of the preferred embodiment of the invention illustrating stainless steel threads braided about an outer surface of a tube and a transparent, plastic polymeric covering.
Figure 2:
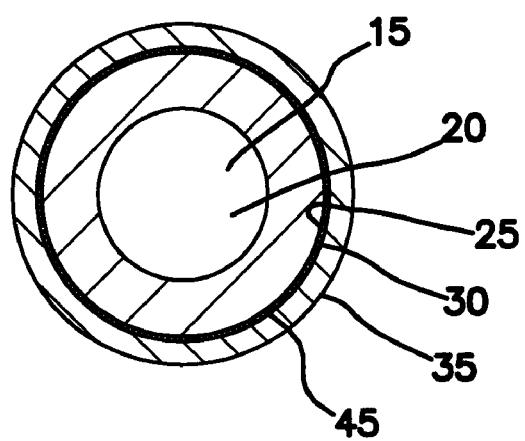
FIG. 2 is cross-sectional view of the FIG. 1 embodiment illustrating a braided layer of steel threads and the transparent, plastic polymeric covering.
Figure 3:
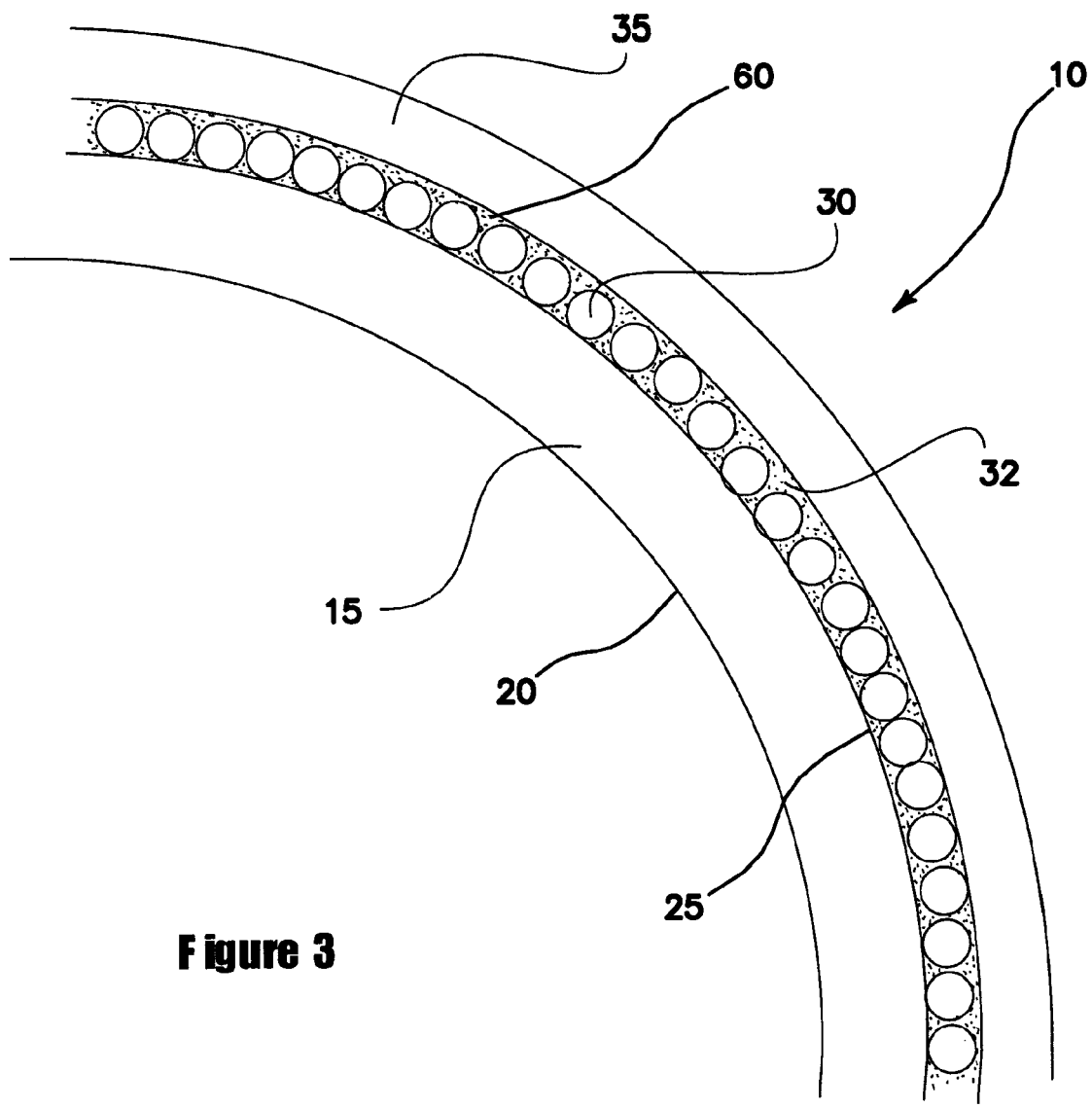
FIG. 3 is a partial, magnified cross-sectional view of the FIG. 1 embodiment illustrating the dispersal of the moisture sensitive compound.
Figure 3A:
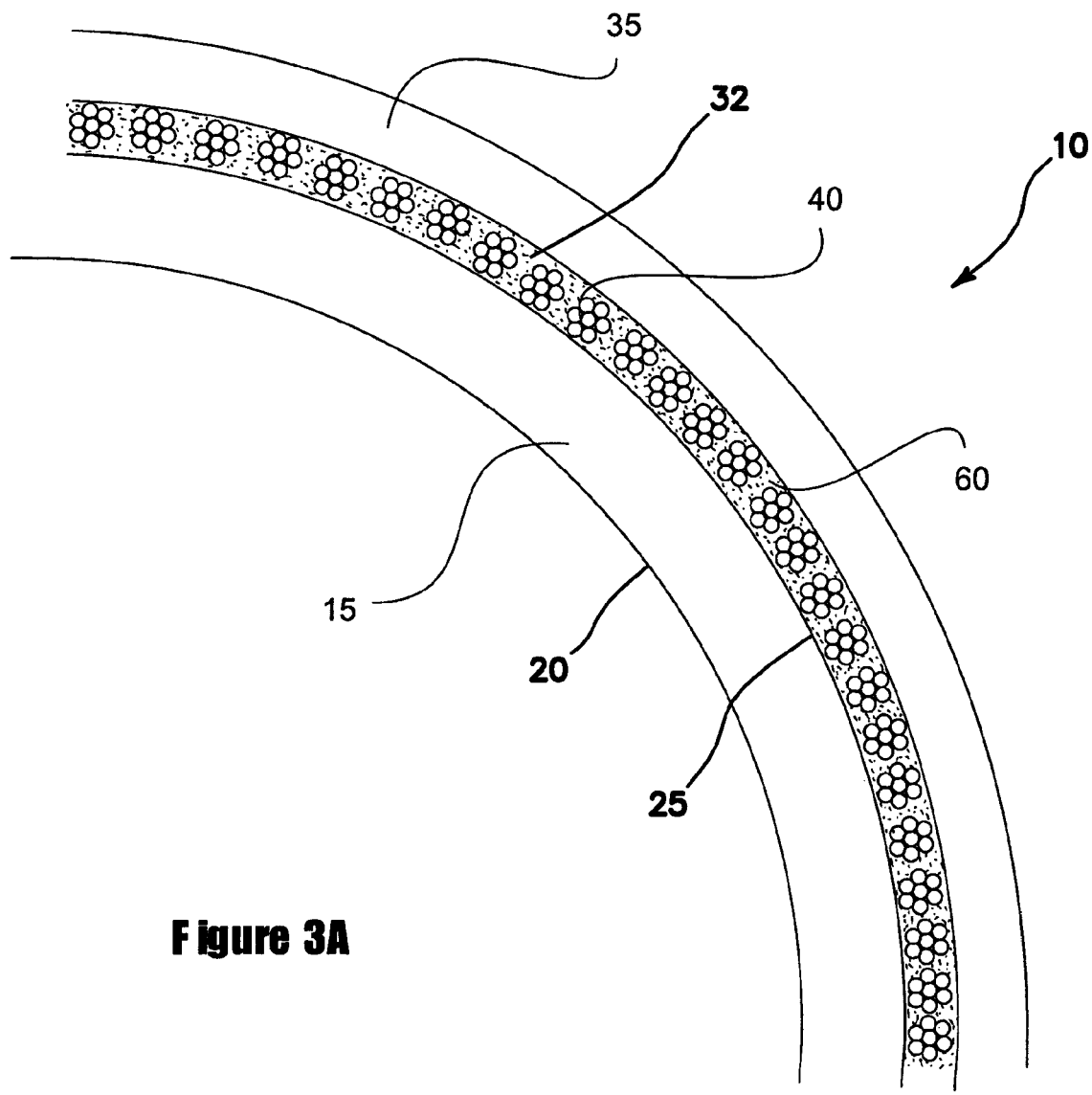
FIG. 3A is a partial, magnified cross-sectional view of the FIG. 3 embodiment illustrating the braiding of the steel threads and the dispersal of the moisture sensitive compound.
Figure 4:
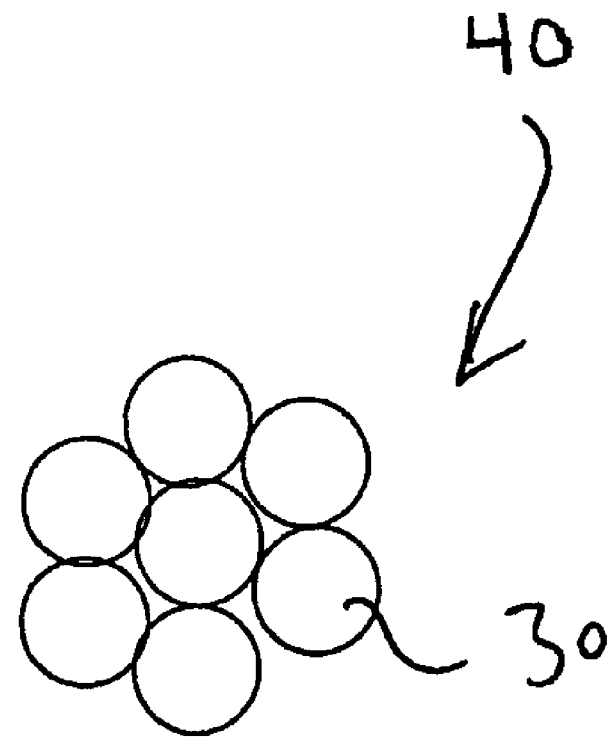
FIG. 4 is a magnified, cross-sectional view of a strand of stainless steel threads.
Figure 4A:
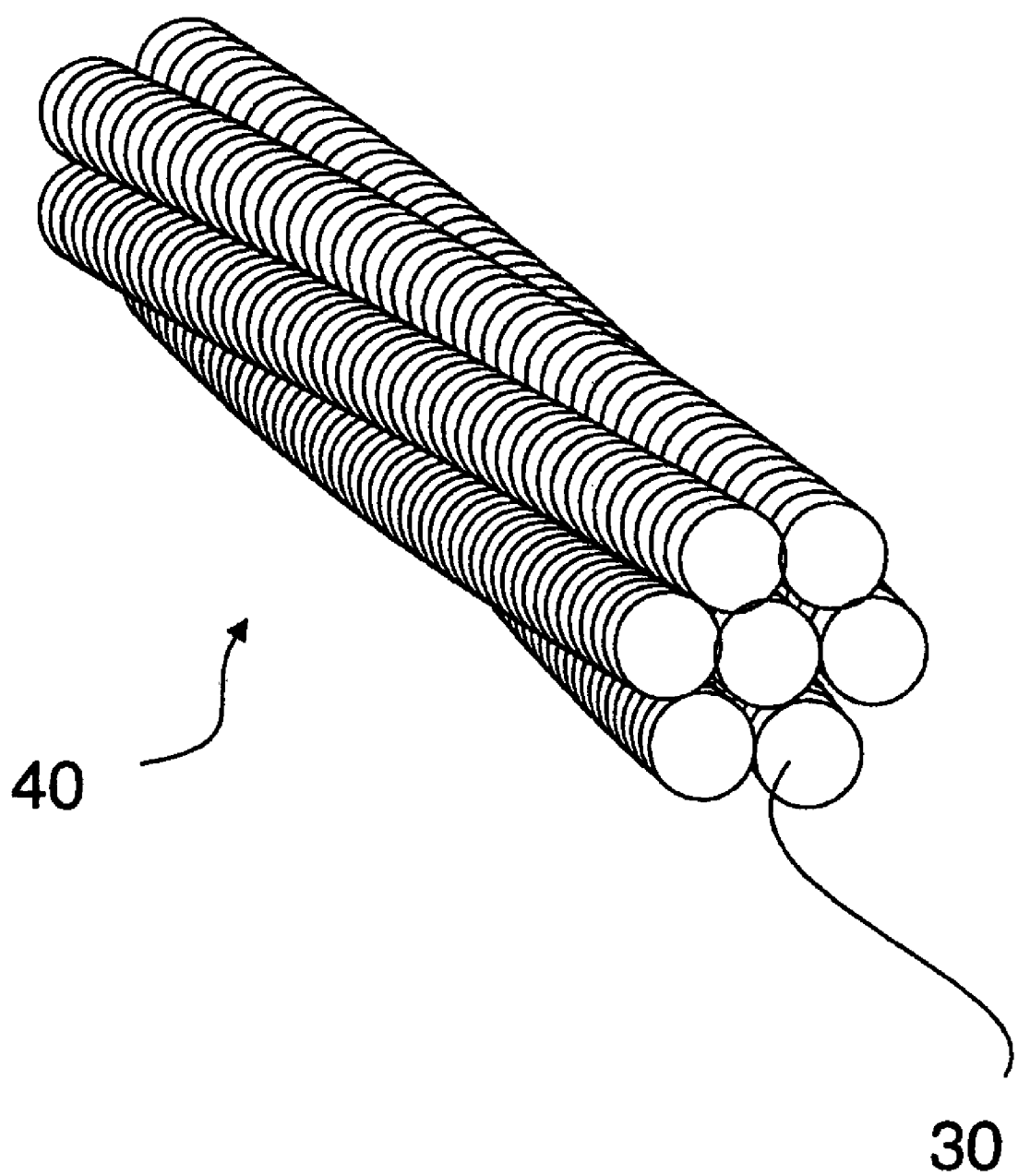
FIG. 4A is a perspective view of a magnified, cross-sectional view of a strand of stainless steel threads illustrating the dispersal of the moisture sensitive compound among the threads.

DETAILED DESCRIPTION OF THE PREFERRED EMBODIMENT (1) Referring to FIGS. 1, 2 and 3, 3A, 4 and 4A, a reinforced flexible hose 10 is provided. The hose 10 has an interior tube 15 for conducting a fluid. The tube 15 has an inner bore 20 and an outer surface 25. At least one layer of stainless steel threads 30 are braided about the outer surface 25 and a transparent flexible polymeric covering 35 is located over the stainless steel threads 30. The flexible polymeric covering 35 is not in intimate contact with the circumference of every thread 30. The flexible polymeric covering 35 only contacts the threads 30 tangentially. Thus pockets of air 60 are trapped between the covering 35 and the braid 30 thereby protecting the braid 30 from abrasion and corrosion and improving the insulative properties of the hose 10. A moisture sensitive compound 32 is provided. The compound 32 changes from an initial color 34 to a second color 36 upon contact with moisture 38. The compound 32 is dispersed in the pockets of air 60 trapped between the threads 30 and the transparent flexible polymeric covering 35. When moisture 38 penetrates from the interior tube 15 to the stainless steel threads 30, the moisture sensitive compound 32 will changes to the second color 36, indicating failure of the hose 10.

(2, 14) In a variant, the interior tube 15 is formed of synthetic polymer material.

(3, 15) In another variant, the interior tube 15 is formed of material selected from the following group: ethylene-propylene-compound diene, acrylonitrile-butadiene, synthetic resinous fluorine, nylon, thermoplastic polyester elastomer, polyurethane, polyvinyl chloride and rubber.

(4, 16) In yet another variant, the stainless steel threads 30 are grouped into distinct strands 40 that are interwoven to form at least one braided layer 45 of threads 30.

(5, 17) In a further variant, each strand 40 has between about two and about nine stainless steel threads 30.

(6, 18) In still a further variant, a gauge of the stainless steel threads 30 ranges from about 0.002 inches to about 0.070 inches.

(7, 19) In another variant, the stainless steel threads 30 are located about the interior tube 15 under tension and the tension ranges from about 0.5 pounds to about 3 pounds.

(8, 20) In yet another variant, the moisture sensitive compound 32 is selected from the group including copper sulfate, cobalt chloride, and cobalt iodide.

(9, 21) In a further variant, the flexible polymeric covering 35 is formed of material selected from the following group: ethylene-propylene-compound diene, acrylonitrile-butadiene, synthetic resinous fluorine, nylon, thermoplastic polyester elastomer, polyvinyl chloride, polyurethane and rubber.

(10, 22) In yet another variant, the flexible polymeric covering 35 is about 0.8 to 1.0 mm thick.

(11) The hose 10 is manufactured as follows.

(12) A. The interior tube 15 is fabricated, preferably by extrusion.

B. At least one layer of stainless steel threads 30 is braided about the outer surface 25 of the interior tube 15.

(13) C. The transparent, flexible polymeric covering 35 is fabricated, preferably by extrusion.

D. The moisture sensitive compound 32 is dispersed between the stainless steel threads 30.

E. The flexible polymeric covering 35 is slipped over the braid 30. This traps pockets of air 60 between the covering 35 and the braid 30 thereby protecting the braid 30 from abrasion and corrosion and improving the insulative properties of the hose 10. The moisture sensitive compound 32 alerts the user to any leaks in the hose 10 through a visual inspection.

The invention claimed is:

1. A reinforced flexible hose with leakage indicator, comprising:
   an interior tube for conducting a fluid, said interior tube having an inner bore and an outer surface;
   at least one layer of stainless steel threads braided about said outer surface;
   a flexible, transparent polymeric covering, said covering being disposed over said stainless steel threads and contacting them tangentially, whereby pockets of air are trapped between said threads and said flexible polymeric covering, said flexible polymeric covering protecting said threads from abrasion and corrosion, and said pockets of air improve the insulative properties of said hose;
   a moisture sensitive compound, said compound changing from an initial color to a second color upon contact with moisture and being disposed in said pockets of air trapped between said threads and said flexible polymeric covering; and
   said initial and second colors, visible through said flexible transparent polymeric covering, indicating a failure of said interior tube and impending failure of said hose.

2. The reinforced flexible hose with leakage indicator as described in claim 1, wherein said interior tube is formed of synthetic polymer material.

3. The reinforced flexible hose with leakage indicator as described in claim 1, wherein said interior tube is formed of material selected from the group comprising:
   ethylene-propylene-compound diene, acrylonitrile-butadiene, synthetic resinous fluorine, nylon, thermoplastic polyester elastomer, polyurethane, polyvinyl chloride and rubber.

4. The reinforced flexible hose with leakage indicator as described in claim 1, wherein the stainless steel threads are grouped into distinct strands that are interwoven to form the at least one braided layer of threads.

5. The reinforced flexible hose with leakage indicator as described in claim 4, wherein each of said threads includes between about two and nine stainless steel threads.

6. The reinforced flexible hose with leakage indicator as described in claim 1, wherein a gauge of said stainless steel threads ranges from about 0.002 inches to about 0.070 inches.

7. The reinforced flexible hose with leakage indicator as described in claim 1, wherein said stainless steel threads are disposed about said interior tube under tension and wherein said tension ranges from about 0.5 pounds to about 3 pounds.

8. The reinforced flexible hose with leakage indicator as described in claim 1, wherein said moisture sensitive compound is selected from the group comprising:
   Copper sulfate, cobalt chloride, and cobalt iodide.

9. The reinforced flexible hose with leakage indicator as described in claim 1, wherein said flexible polymeric covering is formed of material selected from the group comprising:
   ethylene-propylene-compound diene, acrylonitrile-butadiene, synthetic resinous fluorine, nylon, thermoplastic polyester elastomer, polyvinyl chloride, polyurethane and rubber.

10. The reinforced flexible hose with leakage indicator as described in claim 1, wherein said flexible polymeric covering is about 0.8 to 1.0 mm thick.

* * * * *